United States Patent
Hackner et al.

(10) Patent No.: US 7,138,790 B2
(45) Date of Patent: Nov. 21, 2006

(54) CONTROL DEVICE FOR CONTROLLING A CHARGING SWITCH IN A SWITCHING REGULATOR AND METHOD FOR CONTROLLING A CHARGING SWITCH

(75) Inventors: Michael Hackner, Parsberg (DE); Roland Ernst, Erlangen (DE); Hans-Peter Hohe, Heiligenstadt (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 11/363,491

(22) Filed: Feb. 27, 2006

(65) Prior Publication Data

US 2006/0209577 A1  Sep. 21, 2006

Related U.S. Application Data

(63) Continuation of application No. PCT/EP2004/009495, filed on Aug. 25, 2004.

(30) Foreign Application Priority Data

Aug. 27, 2003 (DE) ............... 103 39 482
Jan. 29, 2004 (DE) ............ 10 2004 004 540

(51) Int. Cl.
*G05F 1/56* (2006.01)
*H02M 3/156* (2006.01)

(52) U.S. Cl. ..................... 323/282; 323/285
(58) Field of Classification Search ................ 323/282, 323/283, 284, 285, 286
See application file for complete search history.

(56) References Cited

U.S. PATENT DOCUMENTS 4,318,165 A    3/1982   Kornrumpf et al.

(Continued)

FOREIGN PATENT DOCUMENTS

DE    195 05 417 A1    8/1996

(Continued)

OTHER PUBLICATIONS

Tietze, U. et al.; "Halbleiter-Schattungstechnik"; Neunte, neu bearbeitete und erweitarte Auflage, p. 564, Springer-Verlag, Berlin, 1989.

*Primary Examiner*—Adolf Berhane
(74) *Attorney, Agent, or Firm*—Gardner Groff Santos & Greenwald, PC

(57) ABSTRACT

A control device for controlling a charging switch in a switching regulator with an inductance, a filter capacitance and a diode comprises a clock generator for providing an operating clock, an output voltage detection means and an inductance current detection means, as well as a comparator for comparing the detection signals generated by the two detection means. The charging switch is switched on by an event in the clock and switched off when the comparator determines a predetermined relation between the two detection signals. The voltage detection signal is formed to have an inverted curve in relation to the detected output voltage, such that when the output voltage to be detected increases the detection signal falls and vice versa. Thus, a stable and simple regulation of the output voltage across a current locked loop is possible, where no filtering of an actual value has to be performed. Thus, a stable current locked loop with simple structure is obtained in a wide range.

18 Claims, 8 Drawing Sheets

U.S. PATENT DOCUMENTS

| | | |
|---|---|---|
| 5,625,538 A | 4/1997 | Lee et al. |
| 5,770,940 A | 6/1998 | Goder |
| 6,057,675 A * | 5/2000 | Tateishi ............... 323/283 |
| 6,307,360 B1 * | 10/2001 | Kajiwara et al. ....... 323/282 |
| 6,370,045 B1 | 4/2002 | Lürkens |
| 6,465,993 B1 | 10/2002 | Clarkin et al. |
| 6,476,589 B1 * | 11/2002 | Umminger et al. ...... 323/282 |
| 6,580,258 B1 * | 6/2003 | Wilcox et al. .......... 323/282 |
| 7,030,596 B1 * | 4/2006 | Salerno et al. ......... 323/282 |
| 7,072,198 B1 * | 7/2006 | Krug et al. ............. 363/127 |
| 7,084,612 B1 * | 8/2006 | Zinn ..................... 323/266 |
| 7,091,711 B1 * | 8/2006 | Yoshida et al. ........ 323/282 |
| 7,095,220 B1 * | 8/2006 | Kernahan ............... 323/300 |

FOREIGN PATENT DOCUMENTS

| | | |
|---|---|---|
| DE | 198 14 681 A1 | 10/1999 |
| DE | 199 33 039 A1 | 1/2001 |
| DE | 199 42 794 A1 | 3/2001 |
| EP | 0 664 596 A1 | 1/1995 |
| EP | 0 759 653 A2 | 2/1997 |
| EP | 0 759 653 A3 | 3/1998 |
| EP | 0 669 703 B1 | 8/2003 |
| WO | WO 2002/052691 A1 | 7/2002 |

* cited by examiner

| S | R | Q |
|---|---|---|
| 0 | 0 | $Q_{n-1}$ |
| 0 | 1 | 0 |
| 1 | 0 | 1 |
| 1 | 1 | 0 |

Q: 0 = switch "open"
(no charge from
$c_s$ through $u_0$)

Q: 1 = switch "closed"
(charge from
$c_s$ through $u_0$)

FIGURE 7

CONTROL DEVICE FOR CONTROLLING A CHARGING SWITCH IN A SWITCHING REGULATOR AND METHOD FOR CONTROLLING A CHARGING SWITCH

CROSS-REFERENCE TO RELATED APPLICATION

This application is a continuation of copending International Application No. PCT/EP2004/009495, filed Aug. 25, 2004, which designated the United States, was not published in English, is incorporated herein by reference in its entirety, and which claimed priority to German Patent Application No. 10339482.6, filed on Aug. 27, 2003, and to German Patent Application No. 102004004540.2, filed on Jan. 29, 2004.

BACKGROUND OF THE INVENTION

1. Field of the Invention

The present invention relates to switching regulators and particularly to controlling the charging switch of a switching regulator with an inductance, a filter capacitance and a diode.

2. Description of the Related Art

FIG. 8 shows a known down converter with a simple switch, such as, for example, shown in "Halbleiter-schaltungstechnik" U. Tietze, C. H. Schenk, Springer-Verlag, 9. Auflage, 1989, illustration 18.37 on page 564. The down converter in FIG. 8 comprises a ring-like circuit with a coil 400, a capacitor 402 and a diode 404. Further, the down converter or switching regulator, respectively, in FIG. 8 comprises a charging switch 406 as well as a control not shown in FIG. 8, which is formed to control the charging switch 406 such that the output voltage of the switching regulator, indicated by $U_{SR}$ in FIG. 8, is maintained on a defined level or in a range around the defined level, respectively.

The circuit shown in FIG. 8 comprises a determined number of nodes, which will be discussed below. A pole of an input voltage source $U_0$ is connected to a first input node 410 of the circuit, while another potential of the input source $U_0$ is connected to a second input node 412. The second input node 412 is typically the ground node. A first output node 414 is also referred to as first output rail or positive output rail, while a second output node 416 is also referred to as second output rail or negative output rail, respectively, when the convention shown in FIG. 8 is used for the output voltage of the switching regulator $U_{SR}$. On the one hand, the switch 406 is connected between the first input node 410 and a first intermediate node 418. Further, the diode 404 is connected between the first intermediate node 418 and the second input node 412, such that the anode of the diode is connected to the second input node 412, while the cathode of the diode is connected to the first input node 418. Further, as shown in FIG. 8, the capacitor 402 is connected between the first output node 414 and the second output node 416. According to the configuration of the network of diode, coil and capacitor shown in FIG. 8, the coil is connected between the first intermediate node 418 and the first output node 414.

Below, the functionality of the circuit shown in FIG. 8 will be discussed. As long as the switch 406 is closed, $U_D$ is equal to the negative input voltage $U_0$. If it opens, the inductor current $I_L$ maintains its direction, and the amount of $U_D$ sinks, until the diode becomes conductive, which means to about 0 potential. The time curve of the coil current results from the law of induction, according to which the voltage at the coil is equal to the product of inductance L of the coil and the derivation of the coil current according to time. During the switch-on time, which means when the input voltage $U_0$ is applied to the diode 404, the voltage $U_0-U_{SR}$ is applied to the inductor. During the switch-off time $t_{aus}$ of the switch 406, the voltage $U_L = -U_{SR}$ is applied to the inductor. Therefore, an amount of current change $\Delta I_L$ results, which is as follows:

$$\Delta I_L = 1/L \cdot (-U_{SR}) \cdot \Delta t_{aus} = 1/L(U_0 - U_{SR})t_{ein}$$

From this balance, the output voltage can be calculated again, which is defined as follows:

$$U_{SR} = [t_{ein}/(t_{ein}+t_{aus})] \cdot U_0 = t_{ein}/T \cdot U_0 = p \cdot U_0.$$

In the previous equation, $T = t_{ein} + t_{aus} = 1/F$ is the oscillation period and $p = t_{ein}/T$ is the so called duty cycle. As expected, it can be seen that the arithmetic average of $U_D$ results as output voltage. Typically, the inductance L of the coil 400 is chosen such that the minimum current is not undershot, as is known in the art. Further, it is known that by increasing the clock frequency, the inductance can be reduced. Further, with too high frequencies, the effort for the switching transistor and the control circuit increases. Additionally, dynamic switching losses increase in proportion to the frequency.

The capacitor 402 determines the ripple of the output voltage. Generating the switching signal for switching the charging transistor 406 is usually performed by a pulse width modulator and a regulator with voltage reference. In particular, a reference voltage providing a set value is supplied to a subtracter, to which the current output voltage $U_{SR}$ is also supplied as actual value. The output signal of the subtracter is supplied to a variable gain amplifier, feeding a comparator, to which, on the other hand, a signal generated by a saw tooth generator is supplied. The output signal of the comparator is the control signal for the switch 406 in FIG. 8. The variable gain amplifier is typically a PI variable gain amplifier. The same increases its output signal for so long until the difference at the output of the subtracter becomes 0, which means until the output voltage $U_{SR}$ is equal to the set output voltage. Typical ranges for dimensioning the coil are in the millihenry range (e.g. 2.7 mH), while typical values for capacitors are in the three-digit micro Farad range (e.g. 100 μF), when switching frequencies in the range of 50 kHz are used.

Switching regulators shown in FIG. 8 are to provide a suitable voltage supply to a subsequently connected circuit, such as an ASIC. The voltage supply consists normally of one or several constant direct voltages of, for example, +5 V or ±15 V. Frequently, the same is not available in the desired form from the start and has to be generated first by, for example, a switching regulator shown in FIG. 8 that can be supplemented by a downstream linear regulator to remove the ripples of the output voltage. Usually, a rectifier is at the input side of the switching regulator shown in FIG. 8 which generates the input voltage $U_0$ from the alternating current or three-phase current net (230 V or 400 V), respectively, of the power station.

Thus, in deviation from the switching regulator shown in FIG. 8, other regulators exist, with a transformer, a rectifier, a smoothing capacitor and possibly a linear regulator for voltage stabilization. However, the transformer is difficult to produce and thus expensive. Further, it requires a lot of space. A further disadvantage of the transformer is its frequency-depending working range. This is, for example, limited to the network frequency of 50 Hz or 60 Hz, respectively. If the frequency deviates, this also causes a deviation of the output voltage of the transformer. The voltage transfer does not work with a direct voltage at the input.

If the transformer is omitted and only rectifier, smoothing capacitor and linear regulator are used, a lot of energy in the form of heat is lost. Additionally, sufficient cooling of the linear regulator has to be provided, which is again very expensive and requires space. All this is avoided by using a switching regulator instead of the linear regulator, as illustrated with regard to FIG. 8. By the significantly better efficiency, little energy in the form of heat is lost and thus the effort for the cooling is significantly lower. As has already been discussed, the switching regulator requires an inductor (the inductance 400 in FIG. 8), which is relatively expensive in the production. However, the same has only one winding and is thus simpler to produce than a transformer having two windings. Above that, the inductor can be minimized by selecting a higher operating frequency, which also works for transformers.

Many known switching network parts, such as the switching network part shown in FIG. 8, are problematical in some regard. Normally, the input voltage range is limited to a ratio of $U_{E,max}/U_{E,min} \leq 5$, which can be seen from catalogs of different providers. This range is too low for some applications and should be increased to a ratio of about 20:1.

The voltage supply of the regulator itself is either performed via a separate voltage source or is generated from the input voltage, which means an additional voltage regulator and thus additional effort.

Further, for a flexible usage, it is intended to be able to select the input voltage significantly higher than the maximum allowable operating voltage of the regulator itself, without using additional voltage regulators for generating this operating voltage.

Additionally, when applying the input voltage, a possibly fast controlled starting of the switching regulator should be ensured. This so called starting-delay should be as small as possible, particularly for time-critical applications.

As has already been discussed, the switching regulator of the down converter type shown in FIG. 8, which is also referred to as buck converter in the art, is based on, the fact that the charging switch 406 is switched on to charge the positive output node 414 against the negative output node 416, and then switch the switch off again, which means to open it, so that the output voltage does not exceed a set value range determined by the average of the finally resulting output voltage $U_{SR}$. Possibilities of regulating the switch are basically filtering the output voltage to obtain an average of the output voltage without ripples, and then controlling the charging switch based on the filtered output voltage by a set/actual comparison. Alternatively, there is also the possibility to regulate the switching regulator based on the current flowing through the coil 400, since the current flowing through the coil 400 is connected to the output voltage, since the output voltage is controlled by charging the node 414 of the capacitor 402. Thus, current regulators exist, which detect the current through the coil 400, filter the current value to obtain an average current value, and which then control the charging switch 406 based on the set/actual comparison due to the filtered current average.

Different regulation concepts are described in DE 19814681 A1, DE 19505417 A1, DE 19933039, EP 0759653 or EP 0664596. Thus, DE 19814681 A1 shows, for example, a current mode switching regulator with a first regulating means for voltage regulation and a second regulation means for load current regulation, each having two inputs and one output, wherein a reference signal can be supplied to a first input of the first regulation means and an output signal of the current mode switching regulator to a second input as a variable, and wherein the output of the first regulating means is coupled to a first input of the second regulator means. Further, a power switch controllable by a control signal of the second regulating means is provided, whose load path is disposed between a first pole with a first supply potential and a second pole with a second supply potential. An inductor means is disposed in series to this load path. Further, an integrator is provided, which generates a regulating signal sampling a load current by time integration of the inductor voltage falling at the inductor means, which is coupled into a second input of the second regulating means as variable. The voltage falling at the inductor inductance is integrated over time by the integrator to detect the current through the inductor.

DE 19933039 A1 discloses an apparatus for generating a regulating signal for a direct voltage converter. The apparatus for generating the regulating signal comprises a voltage regulator and a current regulator. A limiter is provided between the voltage regulator and the current regulator, which serves for limiting the output signal of the voltage regulator. The limiter comprises an input terminal, across which a determinable limit signal for the current set value can be input.

It is a problem of set value regulators operating with a fixed set value, that this set value has to be compared with an actual value. Normally, the set value exists as fixed value, which means as direct signal, while the actual value constantly varies fast, which is an inherent property of the switching regulator, since the ripples of the output voltage as well as the ripples of the output current occur systematically by opening and closing the charging switch. Thus, in these known regulator concepts, an actual value of either the voltage or the current has to be filtered, to obtain a filtered actual value having a direct voltage characteristic, such that a set/actual comparison can be performed at all with the set value present in the "direct current characteristic".

By this filtering, an additional time constant is introduced in the locked loop. Additionally, there is the problem that the current locked loop becomes unstable with higher pulse width ratios. Typically, known current locked loops run only stable up to a pulse width ratio of 50%. With larger pulse width ratios, such a switching regulator becomes instable. This means that a change of the output voltage can no longer be reasonably compensated. For avoiding this instability already at the pulse width ratio of 50%, which means for increasing the pulse width ratio range across 50%, normally, circuits are provided, for example circuits overlaying a saw tooth-shaped voltage across the current limit value predetermined by the voltage regulator to countereffect this instability effect. Thereby, a current locked loop can also be stabilized for pulse ratios of more than 50%. However, this means increased switching effort, since the saw tooth curve has to be generated and laid over the current set value. Further, the switching effort for the filter for filtering the current actual value curve has to be considered. Thus, known concepts have a double disadvantage, since they require a filter for filtering the current value curve, and further require a stabilizing circuit, partly caused by this filter, to realize pulse width ratios of more than 50%.

These additional switching parts have the effect that switching regulators becomes more expensive, particularly when they are to be designed integrably, which is not least caused by the fact that any additional component in an integrated circuit increases the rejection probability for the whole integrated circuit.

Even when such a known switching regulator is not designed in integrated design, the additional switching parts still have to be designed and realized, which can cause cost increases.

SUMMARY OF THE INVENTION

It is an object of the present invention to provide a concept for controlling a charging switch in a switching regulator, which can be realized by reduced switching effort.

In accordance with a first aspect, the present invention provides a control device for controlling a charging switch in a switching regulator with a network of inductance, filter capacitance and diode, wherein an output voltage regulated by controlling the charging switch can be output at the filter capacitance between a first output node and a second output node of the switching regulator, wherein the switching regulator further comprises a first input node and a second input node, wherein the charging switch and the network are connected in series between the first input node and the second input node, and wherein the node, to which the charging switch with the network is coupled, is short-circuited to an output node, having: a clock generator for providing an operating clock; a means for detecting the output voltage between the first output node and the second output node of the switching regulator to generate an output voltage detection signal; a means for detecting a current through the inductance to obtain a current detection signal, wherein the means for detecting the output voltage or the means for detecting the current is formed by the inductance to generate the detection signal such that the same has a time curve inverted in relation to a time curve of an amount to be detected, so that the detection signal falls with a rising signal to be detected and vice versa, a comparator for comparing the current detection signal and the voltage detection signal to determine whether a predetermined relation exists between the current detection signal and the voltage detection signal; and a means for controlling the charging switch with a control signal, wherein the means for controlling is formed to control the switch in response to the operating clock such that the charging switch is closed, and to open the switch in response to a comparator output signal when the comparator determines the predetermined relation.

In accordance with a second aspect, the present invention provides a method for controlling a charging switch in a switching regulator with a network of an inductance, a filter capacitance and a diode, wherein an output voltage regulated by controlling the charging switch can be output at the filter capacitance between a first output node and a second output node of the switching regulator, wherein the switching regulator further comprises a first input node and a second input node, wherein the charging switch and the network are connected in series between the first input node and the second input node, and wherein the node, to which the charging switch with the network is coupled, is short-circuited to an output node, having the steps of: providing an operating clock; detecting the output voltage between the first output node and the second output node of the switching regulator to generate an output voltage detection signal; detecting a current through the inductance to obtain a current detection signal, wherein the output voltage or the current through the inductance are detected such that a detection signal has a time curve inverted in relation to a time curve of an amount to be detected, so that the detection signal falls with a rising signal to be detected and vice versa, comparing the current detection signal and the voltage detection signal in order to determine whether a predetermined relation exists between the current detection signal and the voltage detection signal; and controlling the charging switch with a control signal, wherein the means for controlling is formed to control the switch in response to the operating clock such that the charging switch is closed, and to open the switch in response to a comparator output signal when the comparator determines the predetermined relation.

In accordance with a third aspect, the present invention provides a computer program with a program code for performing the above-mentioned method when the program runs on a computer.

In accordance with a fourth aspect, the present invention provides a switching regulator, having: a charging switch; a network with inductance, filter capacitance and diode, wherein an output voltage regulated by controlling the charging switch can be output at the filter capacitance between the first output node and the second output node of the switching regulator, wherein the switching regulator further comprises a first input node and a second input node, wherein the charging switch and the network are connected in series between the first input node and the second input node, and wherein the node, to which the charging switch with the network is coupled, is short-circuited to an output node, a clock generator for providing an operating clock; a means for detecting the output voltage to generate an output voltage detection signal; a means for detecting a current through the inductance to obtain a current detection signal, wherein the means for detecting the output voltage or the means for detecting the current is formed by the inductance to generate the detection signal such that the same has a time curve inverted in relation to a time curve of an amount to be detected; so that the detection signal falls with a rising signal to be detected and vice versa, a comparator for comparing the current detection signal and the voltage detection signal to determine whether a predetermined relation exists between the current detection signal and the voltage detection signal; and a means for controlling the charging switch with a control signal, wherein the means for controlling is formed to control the switch in response to the operating clock such that the charging switch is closed, and to open the switch in response to a comparator output signal when the comparator determines the predetermined relation.

The present invention is based on the knowledge that a set value/actual value comparison is not performed with a preset set value, but that the "set value" is currently generated in the control device. According to the invention, this set value/current value comparison is only used for opening the charging switch, which means for generating a high resistance in the charging switch, while closing the charging switch, which means generating a lower resistance in the charging switch is performed clock-controlled, which means completely without set value/current value comparison. Thus, according to the invention, no switch-on regulation but merely a switch-off regulation is performed, wherein the switch-off regulation is performed in that a first detection signal, which is representative for the output voltage, is compared to a second detection signal, which is representative for the current through the coil. If the two detection signals have a predetermined relation to each other, the charging switch is opened. In subsequent clock of the clock generator, the charging switch is closed again and the capacitor of the switching regulator is charged again. Then, when the two detection signals, which are actually both current signals, are again in the predetermined relation to each other, which can, for example be an equality relation, the charging switch is opened again, etc.

According to the present invention, either the current detection signal, which is representative for the current curve through the coil, or the voltage detection signal, which is representative for the time curve of the output voltage, is inverted, and inverted such that an increase in the signal to be detected reflects in a decrease of the detection signal and vice versa. A detection signal, which means either the current detection signal or the voltage detection signal, is thus processed such that it is negatively proportional to the signal to be detected, i.e. f(x)=kx, wherein k is smaller than zero. This leads to the fact that by a comparison of the two signals, a stability can be achieved, since an increasing output voltage is reflected, for example, in a decrease of the detection signal, when the voltage detection signal is the negatively proportional signal, so that an altered control of the charging switch leads to the output voltage being changed, for example in opposite direction. Thus, a signal is proportional to the amount to be detected, while the other signal is negatively proportional with regard to the amount to be detected.

Here, it should be noted that it cannot clearly be said whether the voltage detection signal or the current detection signal is the set value or the actual value, respectively. Actually, both signals are set values, which, however, due to the fact that one of the two is inverted, "adjust" such that, on average, a constant coil current and a constant output voltage can be achieved. Which value the constant average output voltage will have, depends on which voltage levels or current levels or generally signal levels, respectively, the two detection signals will be brought, or how the predetermined relation is defined. In other words, the set value is determined by how a level of the current flowing through the coil is transformed, for example, to a level of the current detection signal, and how a level of the output voltage is transformed to the level of the voltage detection signal, and particularly how the level transformation takes place during the detection of the current and the voltage, which means the current detection signal and the voltage detection signal to each other.

In a preferred embodiment of the present invention, where the current and the voltage detection are performed by fed back operational amplifiers, which are controlled by a reference voltage, the output voltage set value or the maximum coil current, respectively, can easily be achieved by dimensioning the resistors of the fed back operational amplifiers as well as by dimensioning the reference voltage, if the same is not set to 0. Alternatively or additionally, the level of the average output voltage or the average coil current, respectively, can be realized by a specific type of comparator. If the comparator is designed such that it does not supply a control signal when the two detection signals are equal, but, for example, supplies a control signal when the two detection signals are apart by a predetermined level, then, a voltage or current control, respectively, can also be performed.

Thus, due to the two detection means of the present invention, the inductor current and the output voltage (within a set range) are mapped into a voltage, for example within a defined range, so that with rising inductor current the mapped voltage, for example, rises, but the mapped output voltage decreases or vice versa, respectively. Then, an independent clock switches the transistor of the switching regulator, whereupon the inductor current and thus also the current detection signal rises. As soon as the current detection signal crosses the voltage detection signal, the switch is switched off again. In regulating terms, this can be represented such that the current voltage detection signal determines the set value for the maximum inductor current in an unfiltered way or vice versa. Thus, no fixed set value is used like in conventional regulators, and therefore no filtering of an actual value has to be performed. By inverting during mapping, for example, the output voltage, it is caused that a lower maximum current is allowed with increased output voltage and vice versa.

The present invention is advantageous in that, on the one hand, the maximum current of the inductor is not exceeded, since both detection signals, which are compared, have ripples determined by the switching regulator. This is also advantageous compared to conventional regulators, since with these regulators, the average inductor current is regulated such that the maximum current can be significantly higher than the average current, such as it is, for example, the case in the so called Luck operation. On the other hand, in the inventive circuit, due to the maximum regulation of the current, the present current is directly "looked at", so that parts of the switching regulators do not have to be "overdimensioned" for a briefly occurring significantly higher maximum current in contrast to the normal operation, which means the average current, which also reduces the cost of the inventive switching regulator concept.

The inventive control device requires neither a filter for filtering the current detection signal nor a filter for filtering the voltage detection signal. This leads also to a simplification of the circuit and thus to cost reduction. Further, it should be noted that the inventive concept positively utilizes these ripples in contrast to the prior art, where the ripples of the output voltage are suppressed by a filter, since the same are helpful in switching off the charging switch.

It is a further advantage of the present invention that it has shown that the inventive control device concept leads to the fact that the current locked loop is stable in a larger operating range. While the stable operating range in conventional regulators without any further measures reaches a duty cycle of 50%, the range of a stable current regulation can always be extended to more than 50% and by corresponding dimensioning theoretically up to 100% in the inventive concept. Reasonable values for practice have resulted in a stable operation with a duty cycle up to about 80% to 90%.

BRIEF DESCRIPTION OF THE DRAWINGS

These and other objects and features of the present invention will become clear from the following description taken in conjunction with the accompanying drawings, in which:

FIG. 7 is an operating table for the register in FIG. 5; and

DESCRIPTION OF THE PREFERRED EMBODIMENTS

Figure 8:
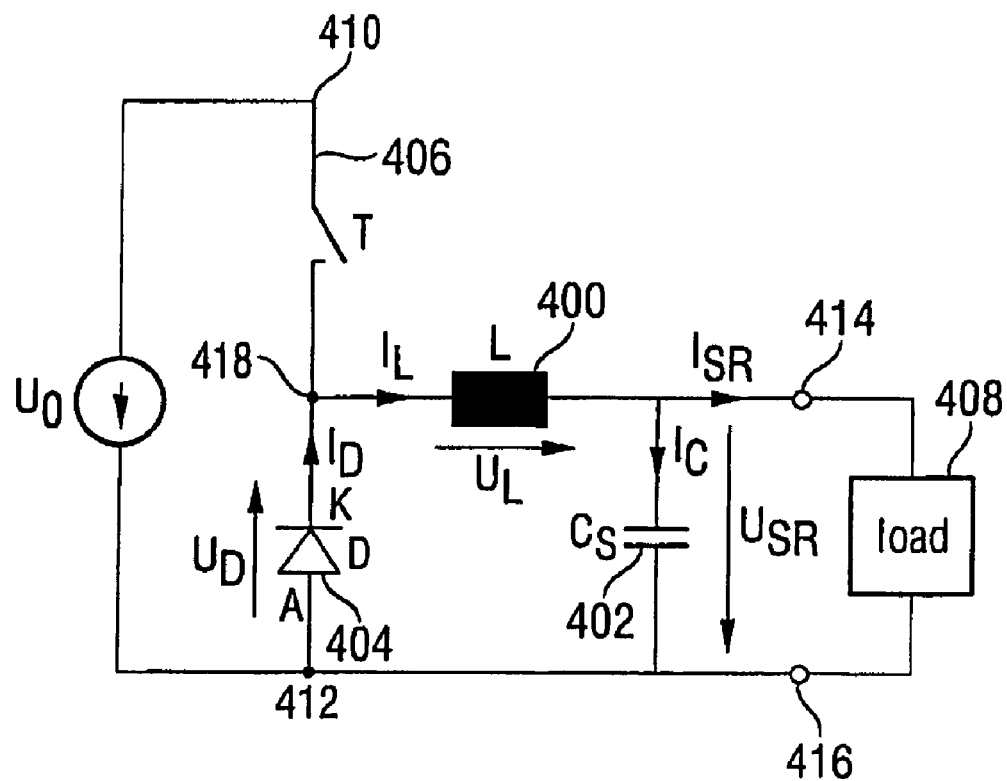
FIG. 8 is a known buck converter.

Before the control 111 of the inventive switching regulator will be discussed in more detail in FIG. 1, first, the mode of operation of a switching regulator that can be used as an alternative to the switching regulator shown in FIG. 8 will be illustrated, with the coil coupled to the anode of the diode and/or a change-over switch with voltage coupling means for controlling the charging switch designed as transistor.

Figure 1:
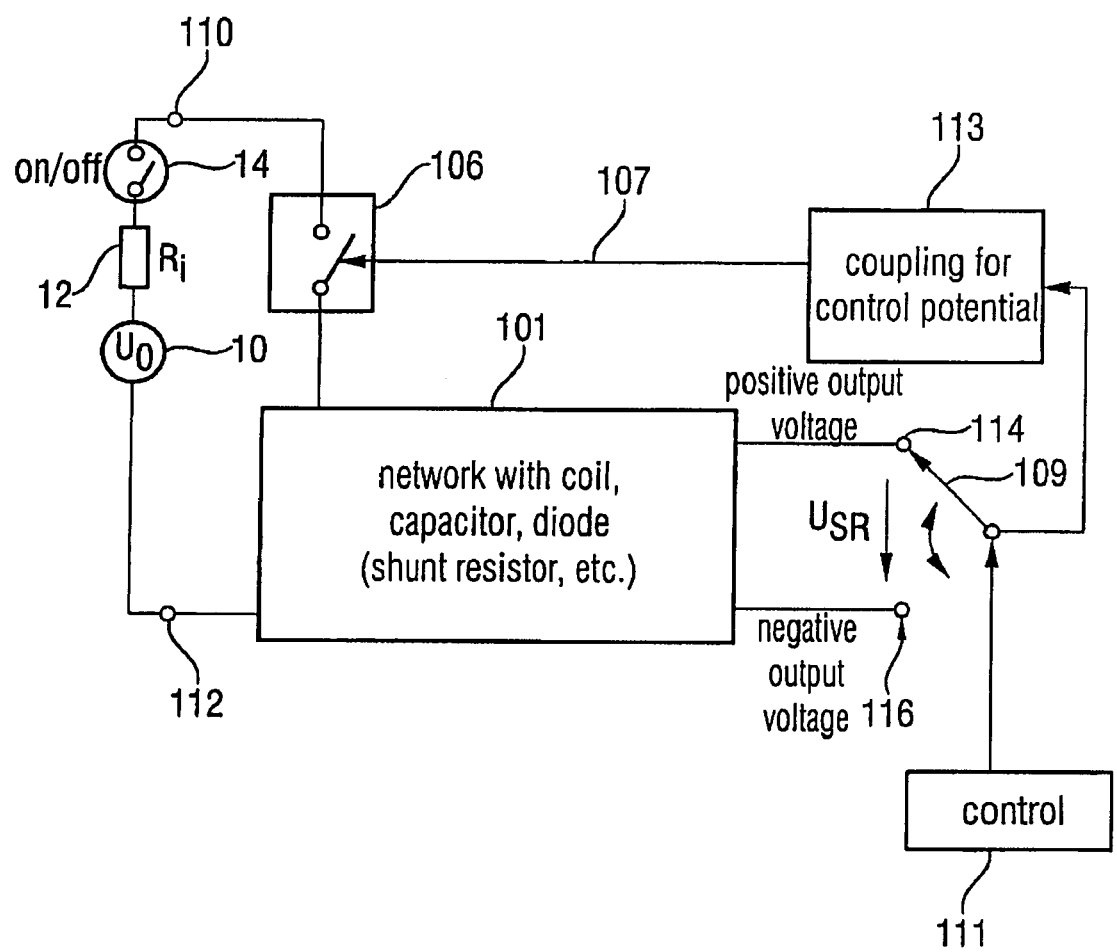
FIG. 1 is a basic block diagram of the inventive switching regulator.

FIG. 1 shows a switching regulator preferred for the inventive control for generating a regulated output voltage $U_{SR}$ by using an input voltage $U_0$, which is shown for clarity reasons as voltage source $U_0$ 10, which is connected in series to an inner resistor $R_i$ 12. If an on/off switch 14 is operated, a voltage is applied between a first input node 110 and a second input node 112. A controllable switch 106 and a network 108, which is a typical switching regulator network with a coil, a capacitor and a diode, are connected in series between the first input node 110 and the second input node 112. Typically, such switching regulator networks 101 also have a shunt resistor to provide a current path with a defined ohmic resistance.

The output voltage regulated by the switching regulator shown in FIG. 1 lies between a first output rail also referred to as positive output rail and identical to the first output node 114, and a second output rail also referred to as negative output rail and identical to the second output node 116. In the embodiment shown in FIG. 1, the positive output rail 114 can be brought to a first (positive) potential, while the negative output rail 116 can be brought to a second potential, which is smaller than the first potential.

The network 101 having a coil, a capacitor and a diode, has the diode particularly switched such that it is coupled to the positive output rail when the coil is coupled to the negative output rail, or that it is coupled to the negative output rail when the coil is coupled to the positive output rail. Typically, the diode will thus be coupled to an output rail, either the positive output rail 114 or the negative output rail 116.

The switch 106 shown in FIG. 1 is also referred to as charging switch, since it is provided for switching the capacitor in the network 101. Particularly, it is connected in series to the diode. The charging switch comprises further a control input 107, across which the charging switch 106 can be closed, which means that the input voltage does not drop at the charging switch but at the network 101. If, however, the switch is opened, the input voltage drops across the switch, the network 101 is thus not provided with the input voltage (apart from transient states).

Thus, the charging switch can be closed or opened via the control input 107. Further, the network 101 comprises a capacitor, which is also referred to as filter capacitor and is switched such that the regulated output voltage can be trapped at the capacitor. Further, a significant part of the network 101 is the inductance, which will be referred to below as coil, which is on the one hand coupled to the diode and on the other hand to the capacitor.

Figure 2:
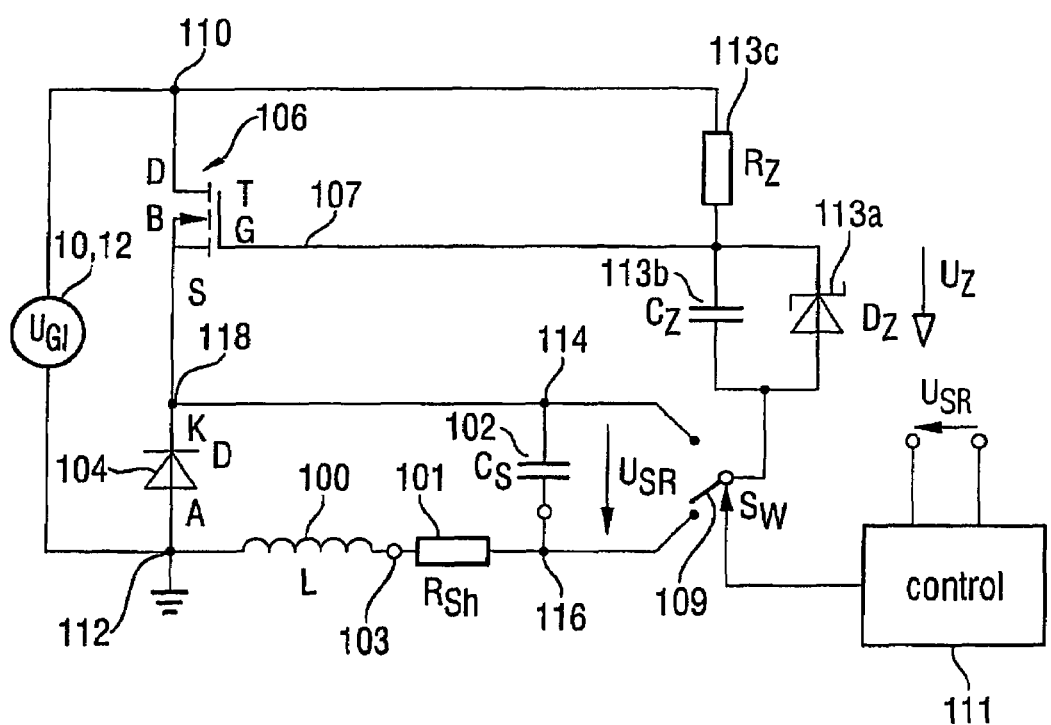
FIG. 2 is a preferred embodiment of the inventive switching regulator with a normally-off transistor as charging switch.
Figure 3A:
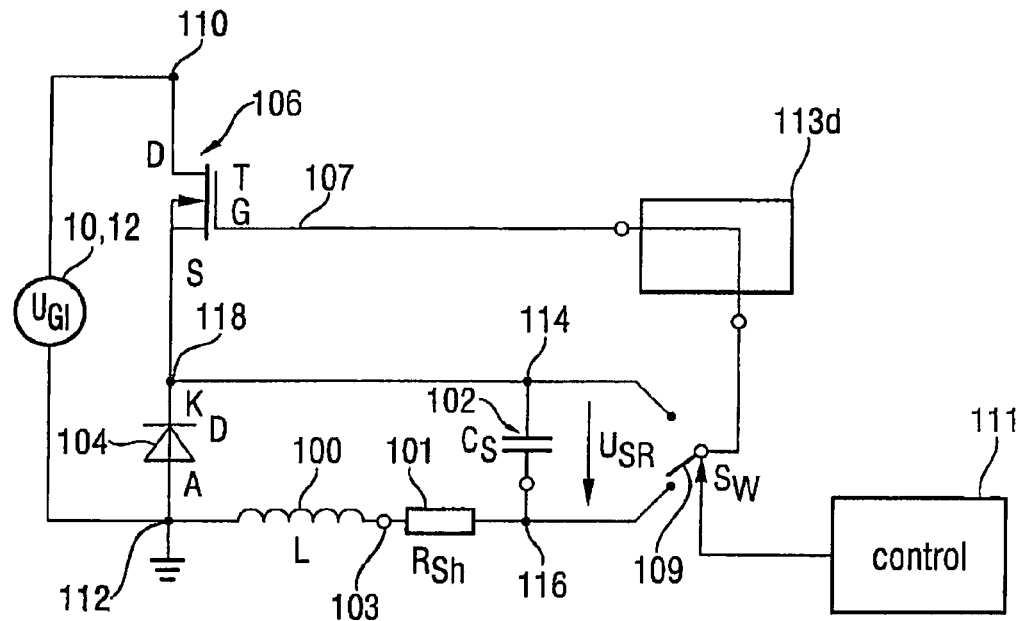
FIG. 3a is an alternative preferred embodiment of the present invention with a normally-on transistor as charging switch.

The switching regulator shown in FIG. 1 further comprises a change-over means 109, which is controllable to couple either the first output rail 114 or the second output rail 116 to the control input 107 of the charging switch via a coupling means 113 depending on a change-over control signal provided by a control 111. Particularly, the charging switch 106 is formed such that it is closed due to a potential at an output rail, and opened due to a potential at the other output rail. In embodiments discussed below, the charging switch 106, as will be discussed below with regard to FIGS. 2 and 3a, is designed as normally-on or normally-off NMOS transistor. In that case, the charging switch 106 is closed (made conductive) by the potential at the positive output rail, while it is opened (open-circuited) by the potential at the negative output rail.

Figure 3B:
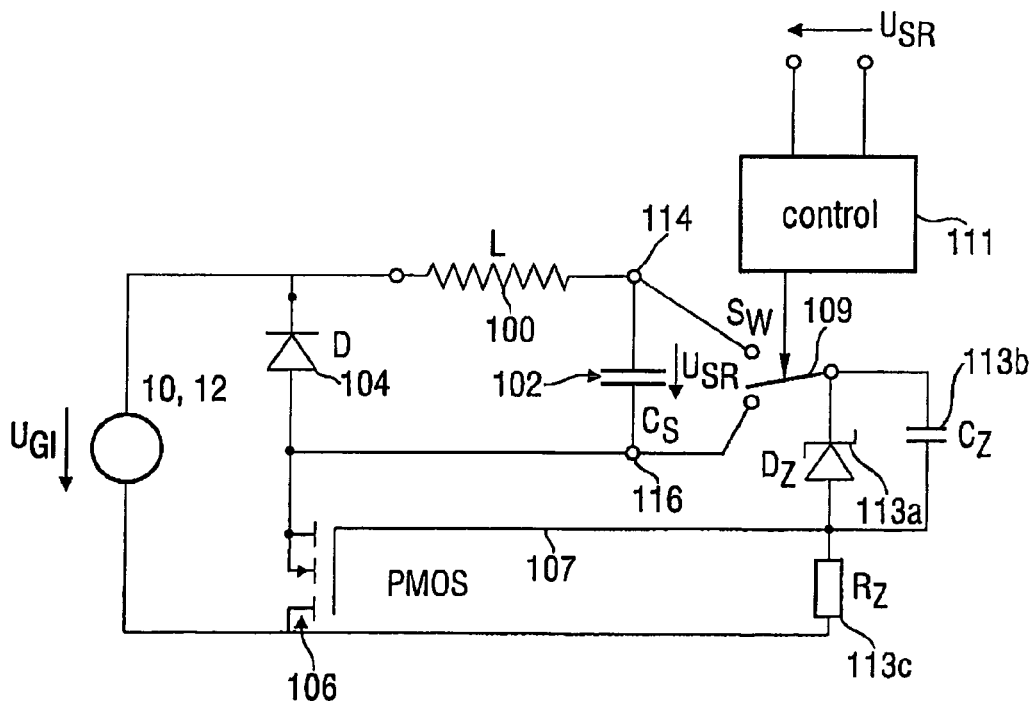
FIG. 3b is an alternative embodiment with a PMOS transistor as switch.

If the switch 106 is designed as PMOS transistor, the coil 100 and possibly the shunt resistor 101 will be connected between the nodes 118 and 114, and the nodes 112 and 116 are short-circuited. The potential at the negative output rail will be used to open the switch while the potential at the positive output rail 114 is used to close the switch 106, which means to bring it into open-circuit operation, while the potential at the positive output rail is used to close the switch 106. A respective circuit is shown in FIG. 3b.

Normally, the control 111 will comprise a regulator which can be designed in any way, as long as it outputs a signal which causes the output voltage $U_{SR}$ to have a defined desired time curve by opening and closing the charging switch 106. Normally, the regulator 111 will operate such that it ensures an output voltage with an average value at the output 114, 116 of the network 101, independent of which load is switched on or which current draws a load, respectively. The time curve of the voltage $U_{SR}$ will typically be a voltage curve with certain ripples around an average value. The ripples can be brought within predetermined tolerance ranges by dimensioning the coil and capacitor, whereby in many cases a signal with ripples around an average value is already sufficient, particularly when the requirements of the switching regulator output signal, which means the voltage $U_{SR}$, are not very high, such as for a lamp or something similar. On the other hand, in the case where the switching regulator as shown in FIG. 1 is integrated on a substrate together with an integrated circuit, which is to be supplied by the same, the same can also be supplemented by a linear regulator downstream of the output 114, 116 of the switching regulator, to fulfill requirements of a voltage $U_{SR}$, which exceed the possibilities of the switching regulator shown in FIG. 1, to provide an output signal $U_{SR}$ with corresponding specification with reasonable effort.

The switch-on/switch-off control is performed such that when the control 111 determines the charging switch is to be opened, the change-over switch 109 is connected to the output rail associated to opening the charging switch 106, in FIG. 1 for example 116, while when the charging switch 106 is to be closed because the capacitor in the network 101 has to be recharged, the control 111 activates the change-over switch 109, to now couple the potential of the upper output rail 114 to the control input 107 of the charging switch 106.

FIG. 2 shows an embodiment where the coil 100 is connected to the diode 104 and the filter capacitor 102. In the comparison of FIG. 2 and FIG. 8, it becomes clear that the coil 100 is no longer connected to the cathode of the diode 104 as in FIG. 8, but with the anode of the diode 104. Further, it can be seen from the comparison of FIG. 2 and FIG. 8, that now the positive output rail 114 with an intermediate node 118, across which the charging switch is connected to the diode 104, coincides with the output node 114, which means the first output rail. Further, a shunt resistor $R_{Sh}$ 101 is shown in FIG. 2, which is connected between the coil 100 and the negative output rail 116. A node 103 between the shunt resistor 101 and the coil 100 is also referred to as lower intermediate node.

Particularly, the charging switch 106 in the embodiment shown in FIG. 2 is designed as normally-off NMOS transistor, whose drain D is connected to the first input node 110, and whose source S is first short-circuited to a bulk terminal B of the transistor, and whose source S is further directly coupled to the positive output node 114, which means the positive output rail. In the embodiment shown in FIG. 2, the coupling means 113 of FIG. 1 comprises a Zener diode $D_Z$ 113a, a capacitor $C_Z$ 113b connected in parallel as well as a series resistor $R_Z$ 113c. The series resistor serves to supply the parallel circuit of the capacitor 113b and the diode 113a forming a voltage drop means across the first input node 110 with current, as will be discussed below.

For the mode of operation of the switching regulator shown in FIG. 2 and switching regulators in general, respectively, the transient characteristics of the memory elements coil L and capacitor $C_s$ are important, since the switching regulator as shown in FIG. 2 achieves a regulation of the output voltage by constantly switching on and off of the charging switch 106.

A coil is characterized in that the voltage falling across the coil is equal to the time leakance of the current flowing through the coil. Correspondingly, a capacitor is characterized in that the current flowing through the capacitor is proportional to the time leakage of the voltage applied to the capacitor.

Further, with regard to the coil, it is of great significance that the voltage applied to the coil can jump, but that the current through the coil cannot jump. Thus, if a coil is switched on, which means a direct voltage (across a source inner resistor) is applied to the coil, the voltage at the coil will increase abruptly to the value of the applied direct voltage and then falls exponentially. Simultaneously, the current slowly starts to increase through the coil from its original value 0, until it reaches the value which is equal to the quotient from the applied voltage and the inner resistor of the source. When this stationary time is reached, the voltage falling across the coil has also become 0.

The same applies inversely to the capacitor. If the capacitor is switched on, the voltage will increase slowly at the capacitor, while the current through the capacitor can jump.

Thus, the elements coil and capacitor differ in that the current can jump through the capacitor while the voltage can jump at the coil. However, the voltage at the capacitor cannot jump. The same applies also to the current through the coil, it cannot jump either. This leads to the fact that the coil operates as short at the time of switching on, which means at the time t=0, when switching on takes place at the time t=0, while the capacitor operates as short.

In the following, reference will be made to switching off of the elements. If a capacitor charged to a direct voltage is separated from the direct voltage source, nothing will happen. The same holds the charge when it cannot discharge across a resistor. However, if switching-off of the capacitor takes place across a short, this causes that a very high current flows, wherein at this time the current and voltage arrow at the capacitor point to opposite directions. Thus, the capacitor operates as generator when it is switched off.

If a coil, through which current is flowing, is switched off, it is again of significance how the coil is switched off. If current is flowing through the coil, a magnetic field exists, wherein energy is stored. If a coil is separated from the source by an open between source and coil, the current through the coil would actually be brought to 0 immediately. However, the energy stored in the magnetic field of the coil has to be allowed to leak. Thus, switching off a coil by generating an open between the source and the coil leads to a high voltage peak, which leads to an arc being formed at the switch across which the energy stored in magnetic field can leak off to the source. For that reason, a coil is discharged across a resistor, a diode or a capacitor in order to avoid the theoretically infinitely high voltage peaks, which would have a destructive effect. This leads to a voltage peak with reduced height. If a coil is switched off, the voltage arrow and the current arrow again point to opposite directions. Thus, the coil operates as generator.

If, as shown in FIG. 2 (or FIG. 3a), the coil is connected in series to a capacitor, then the capacitor is a short and the coil an open at the time of switching on, which means when a voltage of 0 is changed to a voltage with a certain direct voltage value. Thus, the whole switch-on voltage is first applied to the coil and sinks then with increasing current through the series circuit of coil and capacitor. At the time of switching-off a voltage at the coil, the coil still generates a current, which keeps flowing for a certain time, until the energy stored in the coil has leaked off. Normally (when switching off the voltage across a free wheeling diode), the energy from the coil is in the capacitor, i.e. the voltage $U_C$ equals zero.

The functionality of the switching regulator in stationary state will be described below with reference to FIG. 2. At the time when the switch 106 is closed, the full voltage $U_{G1}$ 10, 12 is applied to the diode 104. A current flows across the switch 106 and the coil 100, which charges the capacitor 102. Thus, the potential of the positive output rail 114 rises relative to the negative rail.

On average, the current through the coil 100 is equal to the current supplied to the load connected between the positive output rail 114 and the negative output rail 116.

As long as the switch is off, the inductor feeds the capacitor across the free wheeling diode. As long as the inductor current is higher than the load current, the voltage at the capacitor increases. The more energy passes from the inductor to the capacitor, the smaller becomes the inductor current. At some stage, the inductor current becomes smaller than the load current and from that time onwards the voltage at the capacitor sinks.

In order to avoid that the voltage sinks too far, the switch has to be switched on again, so that the inductor current rises again. However, at the time of switching-on, the inductor current is still lower than the load current, so that the voltage at the capacitor first decreases further. With a conductive switch, the inductor current increases again and becomes at some time larger than the load current. From that time onwards, the voltage at the capacitor increases again. If the current through the inductor becomes too large, the switch is closed again and the current through the inductor becomes smaller again. Now, the cycle starts again from the beginning.

At switch-on time, the node 118 is drawn to the potential of the node 110. Accordingly, the full input voltage UGL is applied to the diode 104. Since the voltage $U_{SR}$ across the capacitance $C_S$ cannot jump, but the voltage cross the coil L, the node 116 is also drawn high, so that the voltage $U_{SR}$ remains constant. Accordingly, the voltage $U_{GL}-U_{SR}$ is applied to the inductor L, so that the current through the inductor increases according to the equation $dI_L/dt=(U_{GL-USR})/L$. Here, the voltage drop at Rsh has been neglected. Since after switching off the switch 106, the current of the inductor can no longer flow through the source $U_{GL}$ and the switch 106, and the inductor avoids a jump of its current, this current has to continue to flow across the free wheeling diode 104. However, this leads to the fact that the potential of the node 118 jumps to a potential which lies about 0.7 V below the potential of the node 112 corresponding to the characteristic curve of this diode. Again, the capacitor $C_S$ avoids a jump of the voltage $U_{SR}$. Thus, at switch-off time, the potential of the node 116 jumps to −(0.7 V+$U_{SR}$). Consequently, a negative voltage is applied to the inductor (node 103–node 112), so that the current through the inductor 100 decreases corresponding to the equation $dI_L/dt=(U_{SR}+0.7\ V)/L$.

In other words, since the full voltage is applied to the diode 104 at the time of switching-on the switch 106, and since the voltage at the capacitor cannot jump as discussed above, but can jump at the coil, the potential of the negative output rail 116 is risen simultaneously the switch-on time.

At some point, the control 111 will operate the change-over switch 109, such that the same is no longer connected to the positive output rail 114 but to the negative output rail 116. This leads to the fact that the transistor 106 is non-conductive and that no current flows from the source 10, 12 into the network of coil, diode and capacitor. This leads to the fact that the coil operates as generator, in that the potential at the node 103 falls and the coil dispenses a current which continues to charge the capacitor 102 across the diode 104, so that after switching off the switch, the voltage $U_{SR}$ rises further. This increase is decelerated by the current flowing across the load, and turns then into a voltage drop when the current drawn through the load becomes smaller than the current supplied by the coil 100 to the node 114. This voltage drop becomes larger, since the coil does no longer provide enough current. Before the voltage becomes too small, the control acts again and connects the change-over switch 109 again to the positive output rail, which leads to the fact that the switch 106 is closed again and supplies current. Due to the above discussed connections, the output voltage $U_{SR}$ decreases further after switching on, until the positive node 114 of the capacitor has "followed" and the voltage $U_{SR}$ rises again. At some time, the control will operate the change-over switch 109 again, so that the same is connected to the negative output rail 116, so that the transistor 107 is non-conductive, which again causes that the voltage rises further, due to the energy stored in the coil (and the capacitor), which leads to a current across the diode 104 and in the positive node 114.

In this embodiment, the switch 106 shown in FIG. 2a is designed as normally-off NMOS transistor. NMOS transistors are conductive when the voltage between the gate, which means the control terminal 107 and the source, is higher than a possibly present threshold voltage. Normally-on NMOS transistors already conduct at a voltage $U_{GS}>0$. In the normally-off NMOS transistor shown in FIG. 2a, the voltage between the gate 107 and the source (node 118 in FIG. 2a) has to be higher than the negative of the amount of the threshold voltage $U_{th}$ of the transistor 106. For that reason, the coupling means 113 of FIG. 1 comprises the elements series resistor 113c, parallel capacitor 113b and Zener diode 113a shown in FIG. 2a.

The Zener diode 113a is configured such that it operates as voltage source from a certain breakdown voltage onwards, which is configured in a fixed way, which means, in other words, that the breakdown voltage $U_Z$ determined by the Zener diode always falls at the parallel circuit of capacitor 113b and diode 113a. If the change-over switch 109 is connected to the positive rail 114, the voltage $U_Z$ falling at the Zener diode is always applied directly between the gate and source of the transistor. The control input 107 of the transistor is thus coupled to the positive output rail across the parallel circuit of capacitor and Zener diode, in that the transistor becomes conductive.

The only constraint therefore is that the breakdown voltage determined by the Zener diode is higher than the threshold voltage of the transistor. However, this prerequisite can easily be fulfilled, since threshold voltages of transistors are typically not very high and Zener diodes with different defined breakdown voltages exist. Further, the Zener diode only has to be adjusted very loosely to the transistor, since the value of the breakdown voltage of the Zener diode has to be only higher than the threshold voltage $U_{th}$ of the transistor. Thus, the requirements of the threshold voltage of the transistor 106 and the breakdown voltage of the diode 113a with regard to the required tolerance are very low.

Since the requirements for the connection between threshold voltage of the transistor and breakdown voltage of the diode are very loose, deviations of the available transistors can be accepted without a circuit becoming rejected. Thus, the illustrated concept is particularly advantageous in that the rejection rate and thus the costs of the final product can be kept low.

If the control determines that the switch 105 is to be switched off again, it controls the change-over switch 109 such that the same is connected to the negative output rail. This leads to the fact that the potential at the gate 107 of the transistor becomes smaller by $U_{SR}$ than in the switched on state. Thereby, the transistor is non-conductive.

It is a particular advantage of the circuit shown in FIG. 2 that defined starting of the circuit is ensured. For the defined starting it is particularly unimportant at first, whether the change-over switch 109 is connected to the positive output rail 114 or the negative output rail 116 at switch-on time. Particularly when the change-over switch 109 is realized as multiplexer of transistors or as inverter, it is not defined whether the change-over switch 109 is connected to the upper rail 114 or the lower rail 116, when it is assumed that the whole circuit shown in FIG. 2 has been in a voltage free state prior to switching on, so that all potentials in the circuit are at the value 0.

This starting state, where all potentials are equal 0, will be assumed below, to represent a starting process of the circuit in FIG. 2. Since all potentials equal 0, the potential between gate 107 and source 118 of the switch also equals 0. Since the transistor is a normally-off transistor, the switch is closed at first. If a positive voltage 10, 12 is applied between the first input node 110 and the second input node 112, which is typically the ground node, then first the capacitor $C_Z$ 113b will be charged across the series resistor $R_Z$, until the voltage at the capacitor $C_Z$ 113b and the Z diode $D_Z$ parallel thereto reaches the threshold voltage $U_{th}$ of the transistor switch 106. As has been discussed, it is unimportant whether the change-over switch 109 is connected to the node 114 or the node 116.

If the change-over switch 109 is connected to the node 114, the voltage $U_Z$ will drop directly between the gate 107 and the source 118 of the transistor.

However, if the change-over switch 109 is connected to the negative rail 116, the capacitor 113b also charges across the series resistor $R_Z$ The potential at the node 118 determining the source potential of the transistor is at first not changed from its 0 value, since no charging of the capacitor 102, by which the potential 118 could be risen, takes place, since the change-over switch 109 is connected to the negative rail 116.

Thus, in both instances of the switch 109, the gate source voltage increases from a value of 0 at the time of switching on the source 10, 12 by operating the switch 14 in FIG. 1 to a value equal to the threshold voltage of the transistor. As soon as this is the case, the drain source path of this switch 106 becomes conductive, and the capacitor $C_S$ is charged (independent of the position of the switch 109). The charging current for the capacitor 102 ($C_S$) flows at the same time across the coil 100 to ground 112. This leads immediately to the fact that the output voltage $U_{SR}$ increases compared to the potential at the negative output rail 116, due to the increase of the potential at the positive output rail 114. This charging process continues until the voltage at the capacitor $C_S$ reaches the voltage at the Z diode minus the threshold voltage of the switch 106.

If the change-over switch 109 is connected to the positive output rail 114, the charging process will be continued, since the transistor 106 is open. If, however, the change-over switch 109 is connected to the negative rail 116, the switch will be closed again, when the potential between gate and source is equal to the threshold voltage. If it is assumed that the potential at the source equals $U_{SR}$, and when it is assumed that the potential at the gate of the transistor is equal to the voltage drop at the Zener diode $U_Z$, a value $U_{SR}$ results at the output of the switching regulator, where the transistor is non-conductive again, as a difference between the voltage at the Zener diode and the threshold voltage. If further measures were taken, the transistor would become non-conductive again and the output voltage would remain at $U_{SR}=U_Z-U_{th}$.

By dimensioning the Zener diode 113a this "remaining value" of the output voltage $U_{SR}$ could be chosen freely. In one embodiment, the Zener diode is dimensioned such that $U_{SR}$ becomes so high (when in the "worst case" the change-over switch 109 is connected to the negative rail 116 for startup), that the control 111, preferably supplied by $U_{SR}$, can already operate. Thus, by dimensioning the Zener diode (and the threshold voltage), the voltage $U_{SR}$ is made so high that when this voltage is applied to the control, the states at the nodes in the control are already defined.

Thus, the control will detect a value $U_{SR}$ and compare the same to a limiting value. As soon as the control determines that $U_{SR}$ has obtained the predetermined state during starting up, the control 111 is effective to ensure that the change-over switch 109 is connected to the positive rail 114. If this had already been the case in starting, the control 111 performs no change of the change-over switch 109. If, however, this was not the case, which means the switch 109 as shown in FIG. 2 was connected to a negative rail 116 at the time of startup, the control will control the change-over switch 109 such that now no longer the negative rail 116 is coupled to the control terminal 107, but that the positive rail 114 is coupled to the control input 107. Thus, the potential of the positive output rail is applied to the anode of the Z diode. Thereby, the voltage at the filter capacitor $C_S$ 102 continues to increase due to the charging current flowing through the charging switch 106, until a desired output voltage is applied to $C_S$. Now, the actual voltage regulation follows, by changing over the change-over switch 109 by the control 111 to switch the switch T on or off, respectively, and to thereby regulate the output voltage $U_{SR}$ according to voltage and current requirements of a load (not shown in FIG. 2).

Thus, the circuit shown in FIG. 2 is particularly advantageous in that it starts up in a defined way, wherein it is unimportant at the time of startup in which position the switch 109 is. Further, it is preferred to dimension the control 111 such that it already operates in a defined way when the output voltage is equal to the Zener diode voltage $U_Z$ minus the threshold voltage of the transistor 107. Thereby, the startup process can be continued in a defined way without individual supply for the control 111. This leads particularly to an inexpensive circuit, since no specific startup measures have to be taken, except ensuring that the change-over switch 109 is connected to the positive rail 114. Since no specific measures are required and particularly no voltage checks have to be performed with regard to the control 111, the startup process takes place very fast.

Further, it should be noted that the voltage rise can be dimensioned very fast by respective dimensioning of the resistor 113c and the capacitor 113b. Thus, it is preferred anyway to dimension the resistor 113c relatively large, so that the power loss generated by the same does not become significant. Further, it is preferred to dimension the capacitor $C_Z$, which anyway only serves for stabilizing the Zener diode 113a or its (smaller) barrier layer capacitance, also in a small way, so that it is quickly charged to the voltage $U_Z$. Thus, starting up takes place without having to consider time constants which would significantly decelerate starting up the switching regulator.

FIG. 3a shows an alternative embodiment differing from FIG. 2 in that the transistor T 106 is now a normally-on NMOS transistor and that the coupling means 113 of FIG. 1 realized in FIG. 2 by elements 113a, 113b, 113c is realized in FIG. 3a by a simple coupling 113d. While in FIG. 2 the potential had been provided with a voltage drop at the first output rail or the second output rail across the coupling means 113, in FIG. 3a, the potential at the first output rail 114 or the second output rail 116 is directly coupled to the control terminal 107 of the switch 106 by a simple connection. The transistor 106 is designed as normally-on n channel MOS FET or n channel JFET. The configuration of the transistor forming the charging switch 106 is identical to the case of FIG. 2 with regard to drain and source.

The voltage source or voltage drop means, respectively, from the Z diode with the series resistor and the parallel capacitor of FIG. 2, is omitted in FIG. 3a to achieve a direct potential coupling from an output rail to the control terminal 107 of the switch. Preferably, the threshold voltage of the transistor $U_{th}$ is dimensioned such that it is equal to the Z voltage of the Z diode minus the threshold voltage of the normally-off MOSFET in the first case, so that the output voltage $U_{SR}$ achieves a value in the starting process by which the control 111 can already be operated in order to be able to control the turnover switch 109 at a time of the startup process such that it is connected to the positive rail 114 in a defined way.

Threshold voltages in normally-on NMOS transistors or N JFET transistors are defined in that they define a negative voltage between gate and source of the transistor, where the transistor 106 is just non-conductive. Voltages, which are higher than the negative threshold voltage, cause then that the transistor conducts, while voltages that are more negative than the threshold voltage cause the transistor to turn into a non-conductive state.

In the following, the startup process of the circuit shown in FIG. 3a will be discussed. Again, it is assumed that all potentials are equal to 0 in the output state. Thus, the switch conducts (it is designed normally-on), which causes the potential at output rail 114 to be raised. It should be noted that at the time of switching on, first both the node 114 and the node 116 are raised to the direct voltage potential, but that the potential difference between the node equals 0. The two nodes 114 and 116 are abruptly raised, since the capacitor, as has been discussed, operates as short at the time of switching-on a direct voltage. Only when charge is provided to the node 114 across the charging switch 106, a potential difference occurs between the node 114 and the node 116, which causes the output voltage $U_{SR}$ to rise from 0 V to values of more than 0 V. Thus, after switching on the voltage, the capacitor 102 is charged across the transistor, which is normally-on.

If the change-over switch 109, which is again designed such that its starting state is undefined, is connected to the positive rail 114, the charging process will be continued, since gate and source of the transistor are shortened, such that $U_{GS}=0$ V, which always means a conductive state between drain and source in the normally-on transistor. If, however, the change-over switch 109 is connected to the negative rail, the charging state will eventually stop, since the source potential, namely the potential of the positive rail 114, constantly increases. When the source potential is higher than the threshold voltage, the transistor is non-conductive and the output voltage $U_{SR}$ does not raise any further. Thus, as has been discussed, the threshold voltage of the transistor 106 is chosen such that an output voltage $U_{SR}$ applied to the output is already sufficiently high to let the control 111 supplied with the voltage $U_{SR}$ operate in a defined way, so that the same separates the change-over switch 109 from the negative rail 116 and connects the same to the positive rail 114, so that the transistor is opened again, so that the charging process of the capacitor 102 can be continued until the control 111 moves to normal operation and performs a switch control due to a actually desired output voltage $U_{SR}$.

In summary, the start-up process in FIG. 3a is such that first the switch T conducts. After applying a positive input voltage $U_{G1}$ to the input of the circuit, the capacitor 102 is charged via the switch T and the inductor L, until the voltage at the capacitor $C_S$ reaches the threshold voltage of the switch T (when the change-over switch 109 was connected to the negative rail 116). Then the voltage at the output of the circuit $U_{SR}$ is already so high that a controlled operation of the regulator is ensured. The same switches the change-over switch sw such that the positive rail of the output voltage $U_{SR}$ is applied to the gate terminal of the switch. Thereby, the voltage at $C_S$ raises further, until the desired output voltage is applied to $C_S$. Now, the actual voltage regulation follows. By changing over the change-over switch $s_w$ through the regulator circuit 111, the switch T is switched on and off, whereby the output voltage $U_{SR}$ is regulated.

With regard to dimensioning the threshold voltage of the transmitter 106 in the case of FIG. 3a or the threshold voltage of the transistor 106 and the Zener diode voltage $U_Z$ of FIG. 2, respectively, it should be noted that these values are dimensioned such that the maximum output voltage value $U_{SR}$, which is obtained automatically without manipulating the circuit and with predetermined position of the change-over switch 109 on the negative rail 116, which results by itself without any intervention, is already so high that the control can be supplied with $U_{SR}$.

If the control 111 or the threshold voltage, respectively, or the threshold voltage and the Zener diode voltage, respectively, are dimensioned such that the output voltage $U_{SR}$, which is obtained "automatically" is already slightly higher than the voltage where the control 111 operates in a defined way, the control 111 can also be designed to turn the change-over switch 109 up, which means to the positive output rail, immediately, when the same can operate in a defined way, which means when the input voltage is sufficiently high. Thus, the change-over time is not limited to the fact that always the maximum automatically obtainable output voltage has to be present to change-over the switch. Instead, it is required that at some stage in the startup process, it is ensured that the change-over switch is connected to the positive output rail 114.

If, however, a control were used, which operates independent of $U_{SR}$, it could be ensured from the beginning, which means already, for example, at the time of switching on the direct voltage $U_{G1}$, that the switch 109 is connected to the positive rail 114. Due to the simplicity of the circuit, however, it is preferred that the control 111 is supplied by the output voltage $U_{SR}$, wherein in that case the dimensioning of the transistor and possibly the diode is pushed to a limit, in that, for example, 90% of the maximally settable output voltage $U_{SR}$ are used up to change over the change-over switch 109, so that the requirements for the control become as low as possible, since typically circuits that can already be used with low voltages are not compatible with the other voltage levels of the circuits shown in FIGS. 2 and 3a, so that an output voltage $U_{SR}$ is preferred, which is as high as possible and settles automatically.

In the embodiments shown in FIGS. 2 and 3a, the coil is not coupled to the cathode of the diode as in FIG. 7, but to the anode. This has the advantage that when the change-over switch 109 is connected to the positive rail 114, the potential generated between gate and source of the transistor is not effected by the transient characteristic of the coil. In another embodiment, the coil can also be coupled to the diode on the cathode side, such that the change-over means 109, when it connects the positive rail to the transistor gate 109, either couples or shortens the coil directly to the gate of the transistor, or indirectly couples the same via a voltage drop means.

Disposing the coil on the anode side of the diode has further the advantage that the input voltage of the circuit is only limited by the electric strength of the three elements switch, diode and inductor. Further, the switching regulator supplies itself and starts up in a defined way. Jumping of the common-mode potential of the output voltage between the positive and the negative rail of the input voltage depending on the state of the switch T is of no primary importance for the load, since it does not notice anything of this jumping, since the load merely experiences the potential difference between the upper output rail and the lower output rail, but not the "absolute" potential of the positive output rail or the negative output rail itself.

As has already been discussed, the starting time itself is defined by the dimensioning of $R_Z$ and $C_Z$, the inductance of inductor L and the capacitance of the filter capacitor $C_S$. An additional starting delay for ensuring the voltage supply of the regulator is not required.

Further, it should be noted that by the illustrated concept, the input voltage range, which is normally limited to an input voltage ratio of $U_{E,max}/U_{E,min} \leq 5:1$, can be increased to at least 50:1, as long as the electric strength of the diode, the coil and the switch is correspondingly entrained, since those elements are provided by the input voltage. However, neither the capacitor nor the change-over switch nor the control are provided with such high voltages, so that the maximum input voltage does not have to be considered for these elements, which again results in an inexpensive and at the same time more flexible switching regulator concept.

Figure 4:
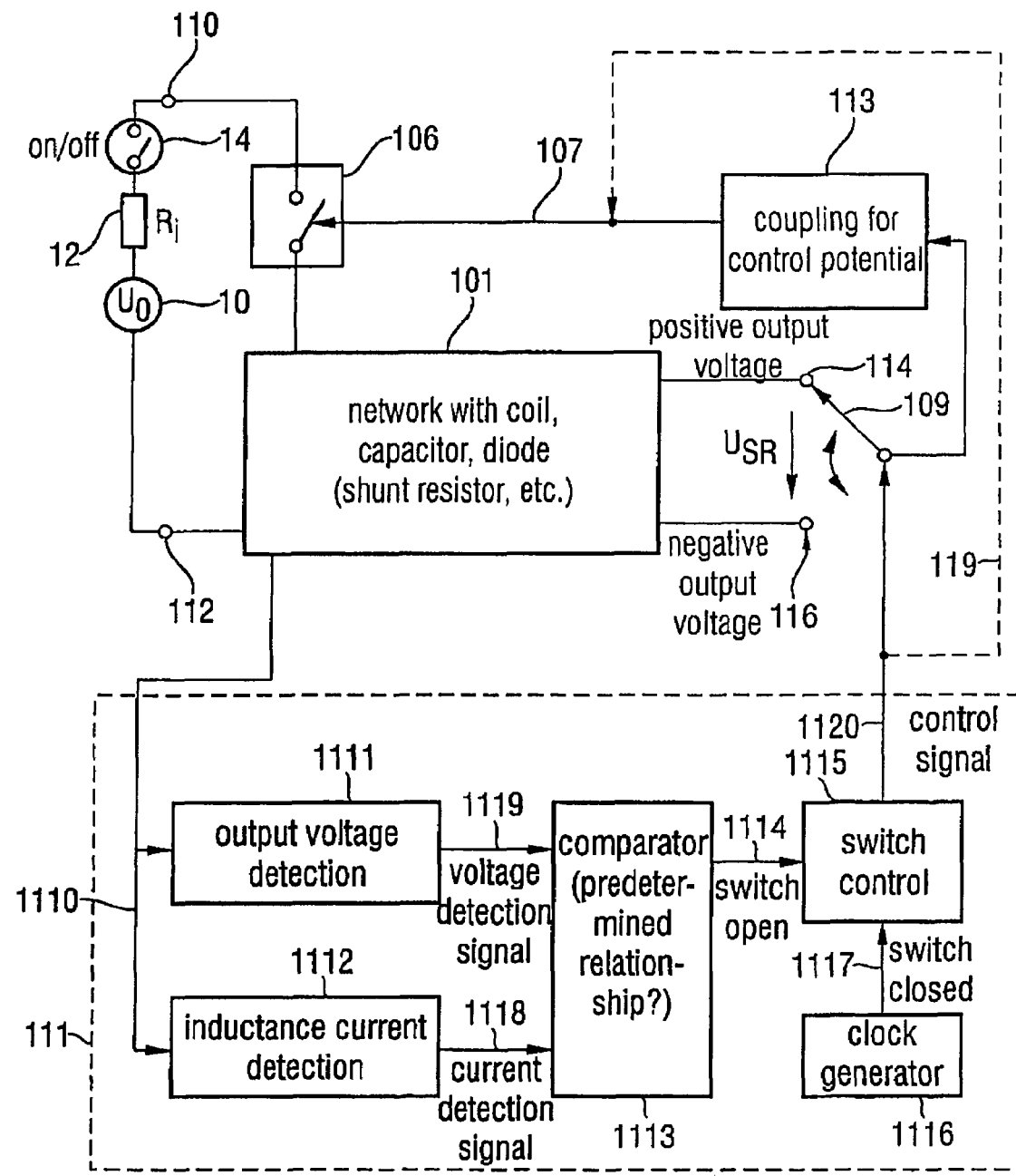
FIG. 4 is a switching regulator according to FIG. 1 with detailed representation of the inventive control.

FIG. 4 shows a detailed representation of the control 111 according to an embodiment of the present invention, which can either be used to control the change-over switch 109 when the charging switch 106 is a transistor, or that can be used to directly control the switch 106 when the switch 106 is any switch that can be opened or closed, respectively, by different control signals. This alternative for controlling a charging switch is illustrated in FIG. 4 by a dotted line 119. There from, it can be seen that the inventive control 111 shown in FIG. 4 can also be used for controlling the general charging switch 406 in FIG. 8 for the known buck regulator.

The control device 111 is coupled to the network 101, having the coil, the capacitance and the inductance, as schematically illustrated by a coupling device 1110. The inventive control comprises an output voltage detection means 1111 for generating the output voltage $U_{SR}$ between the positive output rail 114 and the negative rail 116 or between the positive output node 414 and the negative output node 416, respectively, of FIG. 8. Further, an inductance current detection means 1112 is provided, which is formed to detect the current through the coil or inductance, respectively, in the network 101. It can be shown that the current through the coil in the network 1111 on average is equal to the current through a load coupled to the positive output rail 114 and negative output rail 116, which is supplied by the regulated voltage $U_{SR}$ as shown in FIG. 8 with regard to load 408.

The output voltage detection means 1111 is designed to provide a voltage detection signal on the output side. Correspondingly, the inductance current detection means 1112 is formed to provide a current detection signal on the output side. The voltage detection signal and the current detection signal are fed into a comparator 1113, which is effective to determine whether a predetermined relation between the voltage detection signal and the current detection signal exists or not. In the embodiment shown in FIG. 4, the comparator 1113 is formed to provide an open-switch signal 1114 to a switch actuator 1115 when a predetermined relation between the two signals exists. The switch actuator 1115, which is provided to control the charging switch either directly across the dotted path 1119 or indirectly across the change-over switch 109, is further coupled to a clock generator 1116, which provides a clock signal at the output side, which is effective as close-switch signal 1117. Either the output voltage detection means 1111 or the inductance current detection means 1112 are formed to generate the respective detection signal, which means the voltage detection signal or the current detection signal such that a time curve of the respective detection signal is negatively proportional (f(x)=kx, wherein k is smaller than zero) to a time curve of the detected signal. In other words, for example, the output voltage detection means 1111 is structured such that it provides a voltage detection signal, which increases in level when the level of the output voltage decreases, and which vice versa decreases in its level when the output voltage increases. Thus, the voltage detection signal has a time curve inverted compared to the output voltage to be detected, so that the voltage detection signal drops with increasing output voltage and vice versa.

It should be noted that the output voltage detection means 1111 does not necessarily have to provide the detection signal inverted in its time curve, but that this can also be performed by the inductance current detection means 1112. However, due to the specific circuit configuration illustrated in FIG. 5, it is preferred that the output voltage detection means 1111 provides a detection signal with inverted time curve in order to minimize the number of used elements.

In a preferred embodiment of the present invention, the comparator 1113 is formed to determine whether the voltage detection signal and the current detection signal have the same level. Further, the comparator is, for example, formed such that when the two input signals to be compared are equal, the same outputs a voltage pulse while the comparator does not output anything when the two signals to be compared are not equal. Alternatively, the comparator could be formed to output a first voltage level in the case of equality and to output a second higher or smaller voltage level in the case of inequality. Again, alternatively the comparator could also be formed to generate an increasing signal edge in its output voltage in the case of equality, while a falling signal edge is generated in the case of inequality and vice versa.

Alternatively, the comparator could also be formed to output not only a signal indicating the equality of the input signals to be compared, but which additionally indicates which of the two signals is higher or which of the two signals is smaller, respectively. However, as is illustrated below with regard to FIG. 6, due to the typical curve of the voltage detection signal and the current detection signal to each other it is known from the beginning, which signal is higher and which signal is smaller. However, this is not the case when unexpected load jumps influence the output voltage detection signal.

The switch actuator or switch control means 1115, respectively, is effective to generate a control signal on the output side to close the switch, which means to make the same low-impedance and to open the switch 106, which means to make the same high-impedance. Closing the switch is performed by the clock generator 1116, such that the switch actuator 1115 is effective to control the switch 106 at a certain event in a clock period of the signal generated by the clock generator 1117 that the same is closed, while when the switch was closed, the same is opened again when the comparator receives an open-switch signal 1114 from the switch control means 1115.

In dependence on the specific configuration of the clock generator 1116 or the switch control means 1115, the switch control means 115 can interpret for example a positive clock edge as close-switch signal. Alternatively, a negative clock edge can also be interpreted as a close-switch signal. Depending on the implementation of the switch control means 1115, a second, third etc. rising or falling edge could be interpreted as close-switch signal. Generally, the switch control means 1115 is formed to interpret an event in the clock provided by the clock generator 1116 as close-switch signal 1117, so that when detecting this signal, a corresponding pulse is supplied by the switch control means 1115 to the change-over switch 109 or directly to the charging switch 106. If the clock generator already generates a clock signal with correct voltage ratios, the switch control means 1115 can be effective to simply switch through this signal and apply the same to the change-over switch 109 or to apply the same to the dotted bypass line 119 to control the switch 106 directly.

Figure 5:
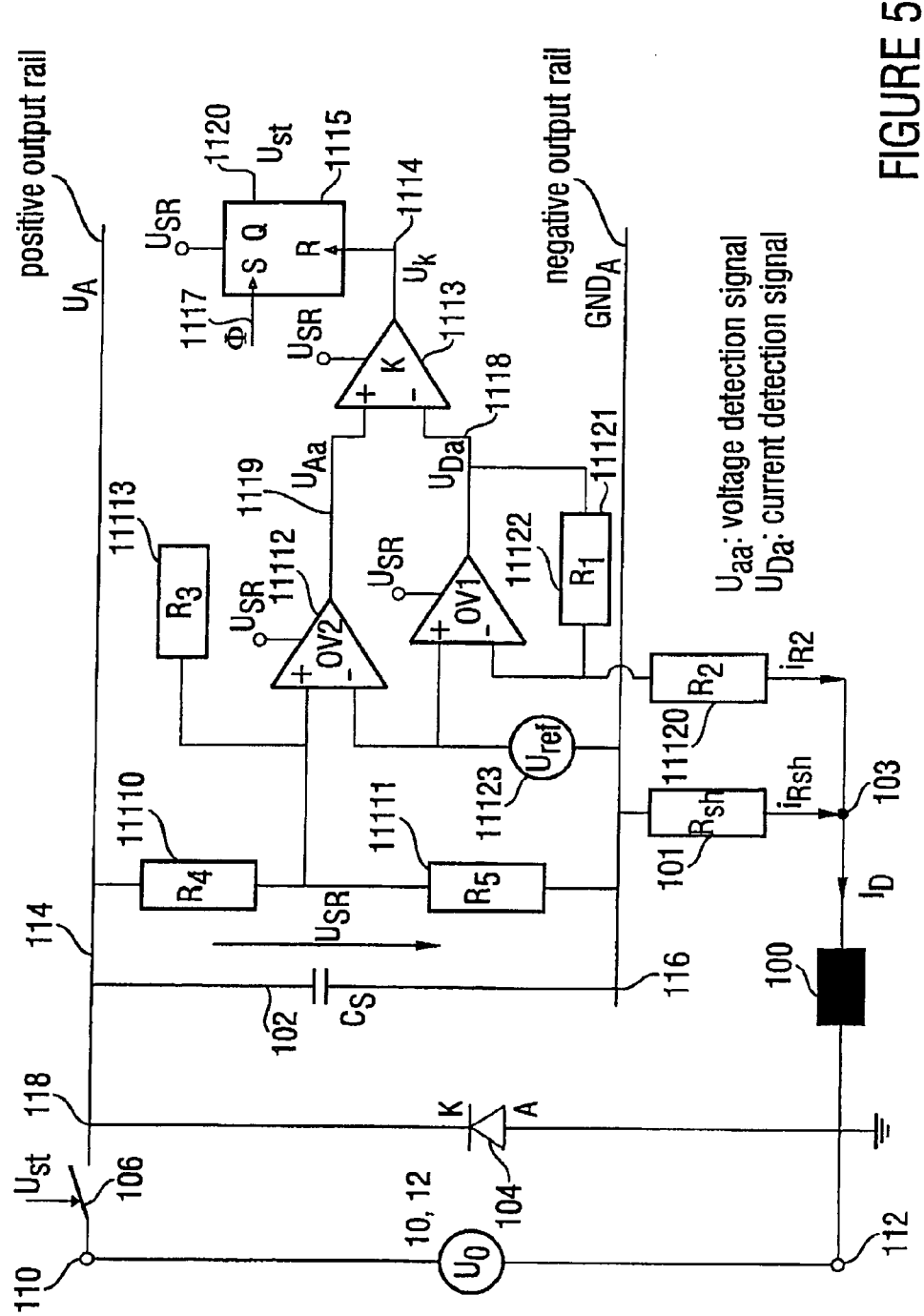
FIG. 5 is a block diagram of a preferred embodiment of the inventive control, wherein apart from resistors merely two operational amplifiers, a comparator and a register are used.

FIG. 5 shows a preferred embodiment of the control 111 of FIG. 4. The inductance current detection means 1112 of FIG. 4 comprises a first current measuring resistor 11120, a feedback resistor $R_1$ 11121, a first operational amplifier OV1 11122, as well as a reference voltage source 11123. A node of the reference voltage source 11123 not connected to the negative output rail 116 is connected to a plus input of the operational amplifier 11122. On the other hand, a node to which the feedback resistor 11121 and the current measuring resistor 11120 are coupled, is connected to a negative input, which means the minus input of the operational amplifier 11122.

The output voltage detection means 11111 of FIG. 4 comprises first a voltage divider with a first resistor $R_4$ 11110 and a second resistor $R_5$ 11111. Further, the output voltage detection means comprises an operational amplifier OV2

11112 as well as feedback resistor $R_3$ 11113. The node where the resistor $R_4$ 11110 and the resistor $R_5$ 11110 are connected to the feedback resistor $R_3$ 11113 is connected to a negative or minus input of the operational amplifier OV2 11112, while the node of the reference voltage source 11123, which is not connected to the negative output rail 11116 is connected to the positive input or plus input of the operational amplifier $OV_2$ 11112.

Thus, the elements with the leading digits "1111" form the output voltage detection means 1111 of FIG. 4, while the elements with the leading digits "1112" form the inductance current detection means 1112 of FIG. 4. It should be noted that the reference voltage source is used both within the inductance current detection means 1112 as well as in the output voltage detection means 1111.

Due to the wiring of the operational amplifier OV2 with the resistors $R_4$, $R_5$ and $R_3$, a signal proportional to the output voltage $U_{SR}$ is inverted, wherein a reference voltage $U_{ref}$ 1123 is added to the inverted signal. This leads to the output voltage reference detection signal $U_{Aa}$ having a time curve inverted with regard to the output voltage signal $U_{SR}$ to be detected, but at the same time having a positive level like $U_{SR}$, which is effected due to the "upward shift" due to the adder functionality of the operational amplifier 11112 (due the wiring with $U_{ref}$).

On the other hand, the current detection signal $U_{Da}$ is a signal, which is directly proportional to the curve of the current $I_D$ through the inductance 100. This is the case since the current $I_D$ or a current $i_{R2}$ flowing due to the resistance ratios of $R_{sh}$ and $R_2$, respectively, is directly proportional to the current through the inductance 100 $I_D$.

It can be seen from FIG. 5 that the two resistors $R_{sh}$ and $R_2$ are not connected. The voltage dropping at the resistor $R_{sh}$ is mapped into the current detection signal $U_{Da}$ by the operational amplifier $OV_1$ by considering the feedback resistors $R_1$ and $R_2$, which is thus directly proportional to the current $i_{Rsh}$, and is thus directly proportional to current $I_D$ flowing through the coil 100.

Figure 6:
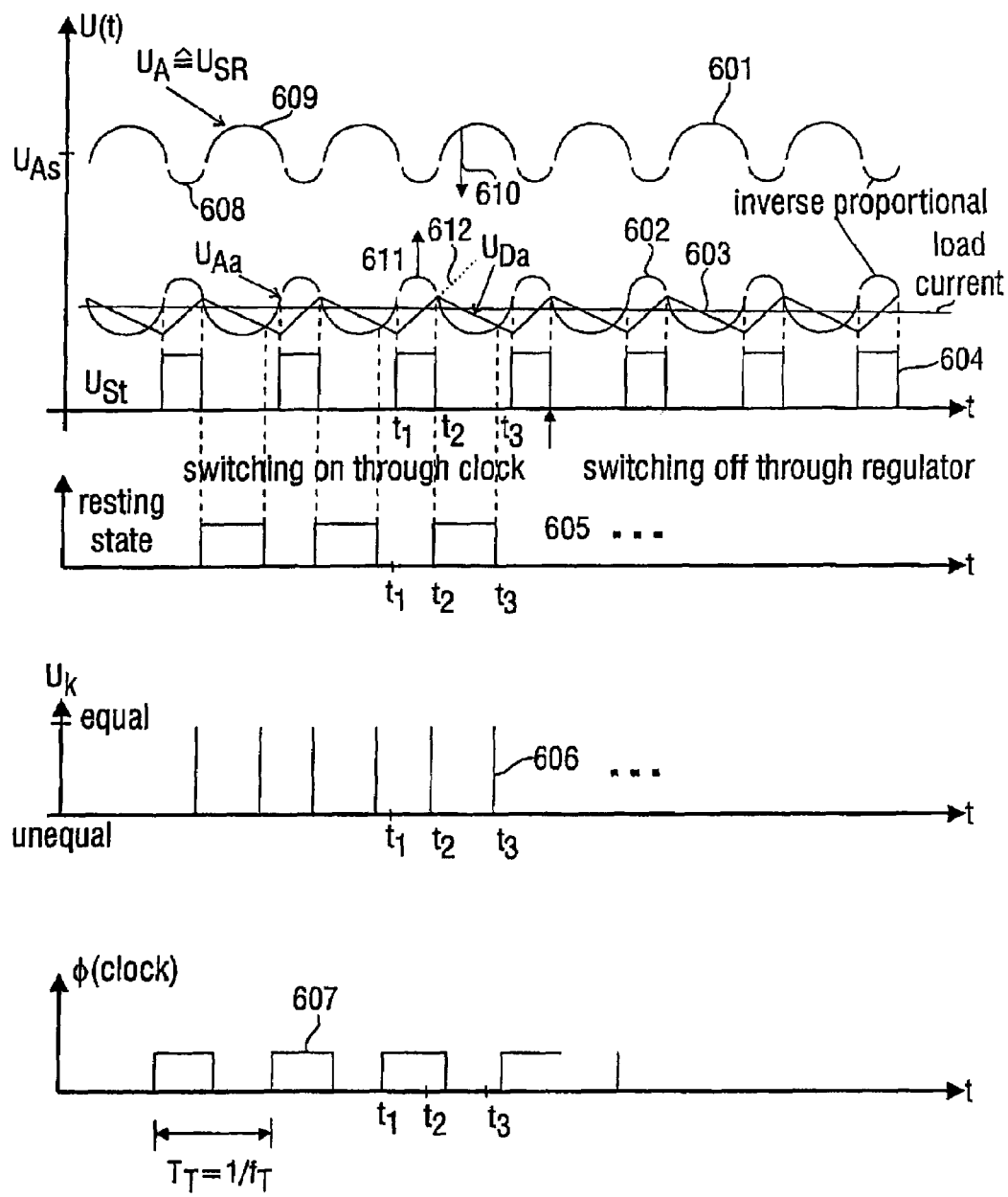
FIG. 6 is a comparison of a time curve of the current output voltage $U_A$, the time curve of the voltage detection signal, the time curve of the current detection signal, the output signal of the switch control means, the reset state of the register and the output signal of the comparator of FIG. 5.

In the following, the functionality of the inventive regulator concept is illustrated with regard to FIG. 6. In FIG. 6, a first signal curve 601 shows a schematically shown time curve of the output voltage $U_A$ or $U_{SR}$, respectively. The reference number 602 indicates the curve of the voltage detection signal $U_{Aa}$ 1119, which is negatively proportional to $U_A$, as seen from FIG. 6. In other words, this means that the voltage $U_{Aa}$ 602 drops when $U_A$ increases, and vice versa. Further, in FIG. 6, the current detection signal $U_{Da}$ is indicated at 603, which is directly proportional to the current through the coil 100.

The reference number 604 indicates the control signal $U_{st}$, which is also indicated by 1120 in FIG. 5 or FIG. 4, wherein the dimensioning of the change-over switch 109 or the charging switch 106 is, for example, such that the switch is closed at a high potential of the control signal 604, which means switched on, while the switch is opened at a low potential of the signal 604, which means it is very high-impedance.

FIG. 6 further shows the state of the reset input of the register 1115, which is preferably used as switch control means. The register 1115 will be discussed below with reference to FIG. 7. The reset state of the register is the state of the output occurring after activating the reset input. This is normally the "low" state.

Further, FIG. 6 shows a schematic time curve of a comparator output signal coming from a comparator 1113, which outputs a voltage pulse when the equality condition is fulfilled, which is indicated as Dirac-impulse, for example, in FIG. 6. The curve of the comparator output voltage $U_k$ is indicated by 606 in FIG. 6. Finally, FIG. 6 shows the time curve of the clock φ 607 in time synchronism to the signals 601 to 606.

In the following explanation of the functionality with regard to the time curves 601 to 607 in FIG. 6, it is assumed that the switch regulator is already started up, as has been explained, for example, with regard to FIGS. 2 and 3a. At a time when the switch 106 is switched on, and which is indicated by $t_1$ in FIG. 6, the current through the inductor was just on a minimum. This was the case since the charging switch had disconnected the voltage source 10, 12 from the diode and thus merely the inductor 100 has output current due to the magnetic energy stored therein, which has slowly decreased. As has been explained, when the switch 106 is open, the only charging current for the capacitor 102 is the current flowing from the inductor across the diode into the mode 114. When the switch is switched on again, the current rises again, as can be seen by the rising edges in signal 603. Then, when the switch is switched off again at a time $t_2$, the current through the coil drops again, since the magnetic field stored in the coil slowly decreases, as can be seen by the falling edges in signal 603.

The output voltage merely illustrated very sketchy with regard to its rise characteristics and fall characteristics, keeps falling at the time of switching on the clock for some time longer, as long as the inductor current is smaller than the load current. Since the inductor current rises after switching on, it will eventually become higher than the load current, whereby the voltage $U_{SR}$ at $C_S$ increases again. If the current reaches the value required by the regulator, the comparison of the comparator effects switching off of the switch. Thereby, the inductor current drops again. However, the voltage $U_{SR}$ rises further, as long as the inductor current is higher than the load current. If the inductor current falls below the load current, the voltage begins to drop again. A further clock pulse starts the described cycles again from the beginning.

The voltage detection signal $U_{Aa}$ has a curve inverted in relation to the output voltage signal $U_A$, so that the output values detection signal 602 has a maximum when the output voltage signal has a minimum and vice versa.

In the embodiment shown in FIG. 5 with a register as switch control signal, the reset state remains until a comparator signal is output to the register 1115, by the comparator at a time $t_3$, where the curve of the voltage detection signal 602 crosses the curve of the current detection signal 602 again, such that the reset state as shown by the time curve 605 is terminated at the register. At a time $t_3$, the register is then again ready to bring the Q output into a high state, when again, for example, a positive clock edge due to the clock 607 is applied to the S input. Thus, in the preferred embodiment, the register 1115 is closed in the time period from $t_2$ to $t_3$, which in any case ensures that the switch remains switched off. However, as can be seen from FIG. 6, the actual switch off time is, longer than the time period between $t_2$ and $t_3$. Further, the reset state of the register is present when the voltage detection signal has a smaller level than the current detection signal. On the other hand, the reset input signal is not active. Thus, controlling the switch is effected when the voltage detection signal 602 is higher than the current detection signal 603.

The register 115 is particularly preferred because it avoids switching-through of the clock when the duty cycle frequency $f_T$ is not dimensioned such that for every clock period length $T_T$ the regulator is turned on once, when, for example, the output voltage has not dropped again so far that it had to be increased again or that a further current from source 10, 12 is required, respectively. This is due to the fact that, when the voltage detection signal 602 is smaller than the current detection signal 603, the register remains in the reset state and thus a positive clock edge, which would effect switching on of the regulator in the non-reset state, is not passed through, so that by constantly switching on the regulator, no too high rise of the output voltage $U_A$ is achieved, although the output load does not have to be supplied any further.

In the embodiment shown in FIG. 6, the duty cycle, which means the time period between $t_2$ and $t_1$ in relation to the clock period length $T_T$, smaller than 50%. However, it can be seen from FIG. 6, that the clock period can easily be increased without causing problems. An increase of the time period between $t_1$ and $t_2$ has the effect that the switch remains close for a longer period, so that more energy is supplied from the source 10, 12 to the switching regulator (and thus the load) per clock. A decreasing output voltage, which means an overall "vertical shift" of the output voltage curve $U_A$ downwards, as indicated by an arrow 610, would immediately cause an overall "vertical increase" of the signal 602 as indicated by an arrow 611, due to the inverted generation of the voltage detection signal. Thus, the intersection between voltage and current due to the finite steepness of the signal curve 602 in the range of the intersection would be shifted with the signal curve 603 further in direction $t_3$, so that then automatically the switch-on time, which means the time period between $t_2$ and $t_1$, increases, since $t_1$ is fixed due to the clock.

For the description it is assumed that the current curve does not change when the output voltage changes. This is not the case in practice, but serves understanding the functionality of the invention. If the curve of the voltage detection signal 602 is raised, the curve of the voltage detection signal will at some time also intersect a dotted continuation of the current curve indicated by 612. The inventive regulator is formed to open the switch again when an intersection between voltage detection signal 602 (which is shifted upwards according to arrow 611) and the dotted continuation 612 of the current curve occurs. Since the voltage detection signal is monotonously dropping in the range of interest, where the switch is to remain closed, and the current detection signal is monotonously rising due to the dotted continuation 612, there will always occur an intersection at some time, independent of whether the duty cycle is 50% or significantly above, such as 80 or 90%.

If, however, the output voltage becomes higher as it should be, it causes that the signal curve 601 is shifted in a vertical direction opposite to the arrow 610, which immediately causes that the signal curve 602 is shifted downwards, in opposition to arrow 611. This means that the equality between the voltage detection signal 602 and the current detection signal 603 is achieved at an earlier time than $t_2$, since, as has been discussed, the current detection signal is monotonously rising in the range of interest, where the switch has to be opened again. Thus, a shorter switch-on time of the switch is achieved, which results in the output voltage falling again. Thus, the output voltage will remain in the range of an output set value $U_{As}$, which can be set by dimensioning the resistors $R_1$ to $R_5$ and $R_{sh}$ as well as by setting the reference voltage source 11123.

The inventive concept of the control device illustrated in FIGS. 4 and 5 has the advantage that the maximum current of the inductor is not exceeded, as has been discussed.

It is another advantage that the voltage amplifier generating the image of the output voltage, which means the operational amplifier 11112 with corresponding connected elements, requires no filter at the output, since the ripples of the output voltage do not interfere but have positive effects.

Further, by the form of the output voltage or its image, respectively, according to the voltage amplifier for generating $U_{Aa}$ in FIG. 5, a larger stable operating range of the current locked loop is obtained. While in conventional regulators, the stable operating range without further measurements goes up to a duty cycle of around 50%, in the new concept, the range of a stable current regulation will always be higher than 50% and can theoretically be extended up to 100% by corresponding dimensioning. In practice, it is preferred to go to values of about 80% to 90%.

Further, it is preferred to "supply" all active elements, such as the two operational amplifiers 11112 and 11122 as well as the register 11115 and reference voltage source 11123 with $U_{SR}$, such that no external components are required for generating a voltage. This is particularly uncritical since the components operational amplifier, comparator, register and reference voltage source, which could optionally also be omitted, are devices that can operate all with relatively low operating voltages, so that even when starting up, a stable and defined operation results from a certain value of the output voltage $U_{SR}$ onwards, which is still lower than the operating output voltage to be generated by the switching regulator. Thus, compared to a control device with external supply, the number of components is reduced. Further, there is no time delay in the inventive regulator, since the same operates as soon as $U_{SR}$ reaches the minimum operating voltage of the operational amplifiers, the comparator, the register and the operating voltage source. Thus, particularly with regard to the reduced number of components (the otherwise required filter for filtering the actual value is also to be mentioned), the inventive control device can be produced inexpensively, particularly in integrable design.

Depending on the circumstances, the inventive method for controlling a charging switch can be implemented in a switching regulator in hardware or in software. The implementation can be made on digital memory media, particularly a floppy disc or CD with electronically readable control signals, that can cooperate with a programmable computer system such that the inventive method is performed. Thus, the invention generally consists also in a computer program product with a program code stored on a machine-readable carrier for performing the inventive method when the computer program product runs on a computer. In other words, the invention can be realized as a computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A control device for controlling a charging switch in a switching regulator with a network of inductance, filter capacitance and diode, wherein an output voltage regulated by controlling the charging switch can be output at the filter capacitance between a first output node and a second output node of the switching regulator, wherein the switching regulator further comprises a first input node and a second input node, wherein the charging switch and the network are connected in series between the first input node and the second input node, and wherein the node, to which the charging switch with the network is coupled, is short-circuited to an output node, comprising:
- a clock generator for providing an operating clock;
- a detector for detecting the output voltage between the first output node and the second output node of the switching regulator to generate an output voltage detection signal;
- a detector for detecting a current through the inductance to obtain a current detection signal,
- wherein the detector for detecting the output voltage or the detector for detecting the current is formed by the inductance to generate the detection signal such that the same has a time curve inverted in relation to a time curve of an amount to be detected, so that the detection signal falls with a rising signal to be detected and vice versa,
- a comparator for comparing the current detection signal and the voltage detection signal to determine whether a predetermined relation exists between the current detection signal and the voltage detection signal; and
- a controller for controlling the charging switch with a control signal, wherein the controller is formed
  - to control the switch in response to the operating clock such that the charging switch is closed, and
  - to open the switch in response to a comparator output signal when the comparator determines the predetermined relation.

2. The control according to claim 1, wherein the predetermined relation is an equality relation within a tolerance range.

3. The control according to claim 1, wherein the detector for detecting the output voltage comprises an inverter and an adder for adding a reference signal to an inverted output voltage signal to obtain the voltage detection signal, which is also positive in a positive output voltage, whose curve, however, is negatively proportional to the curve of the output voltage, so that the output voltage increases when the detection signal decreases and vice versa.

4. The control device according to claim 1, wherein the detector for detecting the current comprises a resistor, wherein current through the inductance or current, which is in a predetermined context to the current through the inductance, flows through the same.

5. The control device according to claim 1, wherein the detector for detecting the output voltage is formed to generate the detection signal such that ripples in the detection signal up to a cut-off frequency correspond to ripples of the detected output voltage, wherein the cut-off frequency is at least so high that spectral components of the output voltage determining ripples of the output voltage are not attenuated in the voltage detection signal within a predetermined tolerance range.

6. The control device according to claim 5, wherein the tolerance range is 3 dB.

7. The control device according to claim 1, wherein the provider for providing an operating clock is coupled to the charging switch via a switch actuator, wherein the switch actuator is formed to allow closing the switch by the clock only when a control signal for the switch actuator is in a predetermined state.

8. The control device according to claim 1, wherein the comparator is formed to provide a control signal for the switch actuator when the current detection signal and the voltage detection signal have the predetermined relation to each other.

9. The control device according to claim 1, wherein the controller for controlling the charging switch has a register having a set input, a reset input and an output, wherein the set input is connected to the provider for providing an operating clock, wherein the reset input is connected to an output of the comparator, and wherein the output of the register is connected to a control input of the charging switch.

10. The control device according to claim 9, wherein the detector for detecting a current through the inductance comprises an inverter having a measuring resistor, a feedback resistor and an operational amplifier, wherein current through the inductance or current being in a predetermined context to the current through the inductance flows through the measuring resistor,
- so that an output voltage of the inverter is proportional to the current through the coil, such that the output voltage rises when the current rises and that the output voltage falls when the current falls.

11. The control device according to claim 9, wherein the input of the operational amplifier of the detector for detecting the current is provided with a defined reference voltage.

12. The control device according to claim 1, wherein the detector for detecting the output voltage comprises:
- a first resistor connected in series to a second resistor, wherein the series connection is disposed between a first node and a second node, wherein the output voltage to be detected is applied between the first node and the second node,
- a further resistor, which is also connected where the first resistor and the second resistor are connected, and forms a feedback resistor for an operational amplifier, wherein further a reference voltage is coupled to an input of the operational amplifier.

13. The control device according to claim 1, wherein the detector for detecting the output voltage and the detector for detecting the current through the inductance are formed to generate detection signals with predetermined levels, wherein average levels of the detection signals together determine a set output voltage level range.

14. The control device according to claim 1, wherein the provider for providing an operating clock is formed to have such a clock frequency that the charging switch is switched on once and switched off once in one clock cycle.

15. The control device according to claim 1, wherein the controller for controlling the charging switch is formed to close the switch in response to a rising or falling edge of the operating clock.

16. A method for controlling a charging switch in a switching regulator with a network of an inductance, a filter capacitance and a diode, wherein an output voltage regulated by controlling the charging switch can be output at the filter capacitance between a first output node and a second output node of the switching regulator, wherein the switching regulator further comprises a first input node and a second input node, wherein the charging switch and the network are connected in series between the first input node and the second input node, and wherein the node, to which the charging switch with the network is coupled, is short-circuited to an output node, comprising the steps of:
- providing an operating clock;
- detecting the output voltage between the first output node and the second output node of the switching regulator to generate an output voltage detection signal;

detecting a current through the inductance to obtain a current detection signal, wherein the output voltage or the current through the inductance are detected such that a detection signal has a time curve inverted in relation to a time curve of an amount to be detected, so that the detection signal falls with a rising signal to be detected and vice versa, comparing the current detection signal and the voltage detection signal in order to determine whether a predetermined relation exists between the current detection signal and the voltage detection signal; and controlling the charging switch with a control signal, wherein the controller is formed to control the switch in response to the operating clock such that the charging switch is closed, and to open the switch in response to a comparator output signal when the comparator determines the predetermined relation.

17. A computer program with a program code for performing the method for controlling a charging switch in a switching regulator with a network of an inductance, a filter capacitance and a diode, wherein an output voltage regulated by controlling the charging switch can be output at the filter capacitance between a first output node and a second output node of the switching regulator, wherein the switching regulator further comprises a first input node and a second input node, wherein the charging switch and the network are connected in series between the first input node and the second input node, and wherein the node, to which the charging switch with the network is coupled, is short-circuited to an output node, comprising the steps of:

providing an operating clock;

detecting the output voltage between the first output node and the second output node of the switching regulator to generate an output voltage detection signal;

detecting a current through the inductance to obtain a current detection signal, wherein the output voltage or the current through the inductance are detected such that a detection signal has a time curve inverted in relation to a time curve of an amount to be detected, so that the detection signal falls with a rising signal to be detected and vice versa, comparing the current detection signal and the voltage detection signal in order to determine whether a predetermined relation exists between the current detection signal and the voltage detection signal; and controlling the charging switch with a control signal, wherein the controller is formed to control the switch in response to the operating clock such that the charging switch is closed, and to open the switch in response to a comparator output signal when the comparator determines the predetermined relation, when the program runs on a computer.

18. A switching regulator, comprising:

a charging switch;

a network with inductance, filter capacitance and diode, wherein an output voltage regulated by controlling the charging switch can be output at the filter capacitance between the first output node and the second output node of the switching regulator, wherein the switching regulator further comprises a first input node and a second input node, wherein the charging switch and the network are connected in series between the first input node and the second input node, and wherein the node, to which the charging switch with the network is coupled, is short-circuited to an output node, a clock generator for providing an operating clock;

a detector for detecting the output voltage to generate an output voltage detection signal;

a detector for detecting a current through the inductance to obtain a current detection signal, wherein the detector for detecting the output voltage or the detector for detecting the current is formed by the inductance to generate the detection signal such that the same has a time curve inverted in relation to a time curve of an amount to be detected, so that the detection signal falls with a rising signal to be detected and vice versa, a comparator for comparing the current detection signal and the voltage detection signal to determine whether a predetermined relation exists between the current detection signal and the voltage detection signal; and a controller for controlling the charging switch with a control signal, wherein the controller for controlling is formed to control the switch in response to the operating clock such that the charging switch is closed, and to open the switch in response to a comparator output signal when the comparator determines the predetermined relation.

* * * * *